(12) United States Patent
Handrich et al.

(10) Patent No.: US 7,481,110 B2
(45) Date of Patent: Jan. 27, 2009

(54) METHOD FOR QUADRATURE-BIAS COMPENSATION IN A CORIOLIS GYRO, AS WELL AS A CORIOLIS GYRO WHICH IS SUITABLE FOR THIS PURPOSE

(75) Inventors: Eberhard Handrich, Kirchzarten (DE); Wolfram Geiger, Freiburg (DE)

(73) Assignee: LITEF GmbH, Freiburg (DE)

( * ) Notice: Subject to any disclaimer, the term of this patent is extended or adjusted under 35 U.S.C. 154(b) by 60 days.

(21) Appl. No.: 10/584,483

(22) PCT Filed: Nov. 26, 2004

(86) PCT No.: PCT/EP2004/013447

§ 371 (c)(1), (2), (4) Date: Jun. 23, 2006

(87) PCT Pub. No.: WO2005/066585

PCT Pub. Date: Jul. 21, 2005

(65) Prior Publication Data

US 2007/0144255 A1    Jun. 28, 2007

(30) Foreign Application Priority Data

Dec. 23, 2003   (DE) .............................. 103 60 962

(51) Int. Cl.
*G01P 9/04*   (2006.01)
*G01C 19/56*   (2006.01)

(52) U.S. Cl. ................ 73/504.12; 73/501.14; 73/504.16
(58) Field of Classification Search .............. 73/504.12, 73/504.14, 504.16
See application file for complete search history.

(56) References Cited

U.S. PATENT DOCUMENTS

| 6,067,858 | A | 5/2000 | Clark et al. |
| 6,752,017 | B2* | 6/2004 | Willig et al. .............. 73/504.12 |
| 2001/0039834 | A1 | 11/2001 | Hsu |
| 2003/0061877 | A1 | 4/2003 | Stewart et al. |
| 2003/0159510 | A1 | 8/2003 | Stewart et al. |

FOREIGN PATENT DOCUMENTS

| EP | 1253399 | 10/2002 |
| EP | 1359391 | 11/2003 |
| WO | 03058167 | 7/2003 |

* cited by examiner

Primary Examiner—John E Chapman
(74) Attorney, Agent, or Firm—Elliott N. Kramsky

(57) ABSTRACT

A method for quadrature-bias compensation in a Coriolis gyro whose resonator is in the form of a coupled system comprising a first and a second linear oscillator. The quadrature bias of the Coriolis gyro is determined. An electrostatic field is produced by variation of the mutual alignment of the two oscillators with respect to one another. The alignment/strength of the electrostatic field is regulated so that the determined quadrature bias is made as small as possible.

8 Claims, 4 Drawing Sheets

METHOD FOR QUADRATURE-BIAS COMPENSATION IN A CORIOLIS GYRO, AS WELL AS A CORIOLIS GYRO WHICH IS SUITABLE FOR THIS PURPOSE

BACKGROUND

1. Field of the Invention

The present invention relates to Coriolis gyroscopes. More particularly, the invention pertains to a method for quadrature-bias compensation in a Coriolis gyro, and to a Coriolis gyro which is suitable for such purpose.

2. Description of the Prior Art

Coriolis gyros (also referred to as "vibration gyros") are increasingly employed for navigation. Such devices include a mass system that is caused to oscillate. The mass system generally has a large number of oscillation modes, initially independent of one another. A specific oscillation mode of the mass system is artificially excited to operate the Coriolis gyro. Such mode is referred to in the following text as the "excitation oscillation".

Coriolis forces occur that draw energy from the excitation oscillation of the mass system when the Coriolis gyro is rotated and transmit a further oscillation mode of the mass system (referred to below as the "read oscillation"). The read oscillation is tapped off to determine rotations of the Coriolis gyro, and a corresponding read signal is investigated to determine whether any changes have occurred in the amplitude of the read oscillation which represent a measure of rotation of the Coriolis gyro.

Coriolis gyros may comprise either an open-loop or a closed-loop system. In a closed-loop system, the amplitude of the read oscillation is continuously reset to a fixed value (preferably zero) via respective control loops, and the resetting forces measured.

The mass system of the Coriolis gyro (referred to below as the "resonator") may be of widely differing designs. For example, it is possible to use an integral mass system. Alternatively, it is possible to split the mass system into separate oscillators coupled to one another via a spring system and capable of movements relative to one another. For example, it is known to use a coupled system comprising two linear oscillators (also referred to as a "linear double-oscillator" system). When such a coupled system is used, alignment errors of the two oscillators with respect to one another are unavoidable due to manufacturing tolerances. The alignment errors produce a zero error component in the measured rotation rate signal, the so-called "quadrature bias" (more precisely, a quadrature-bias component).

Methods such as those disclosed, for example, in U.S. patent application publication 2003/061877, International patent publication WO 03/058167 and U.S. Pat. 6,067,858 are used to compensate for the quadrature bias. Alternating forces are used to compensate for the quadrature bias in this method.

SUMMARY AND OBJECTS OF THE INVENTION

It is therefore an object of the invention to provide a method and a Coriolis gyro for compensating for a quadrature-bias component as described above.

The present invention addresses the preceding and other objects by providing, in a first aspect, a method for quadrature-bias compensation in a Coriolis gyro whose resonator is in the form of a coupled system comprising a first and a second oscillator. Such method includes determination of the quadrature bias of the gyro and production of an electrostatic field to vary the mutual alignment of the two oscillators with respect to one another. The alignment/strength of the electrostatic field is regulated so that the determined quadrature bias is as small as possible.

In a second aspect, the invention provides a Coriolis gyro in the form of a coupled system comprising a first and a second linear oscillator. Such gyro includes a device for production of an electrostatic field for varying the alignment of the two oscillators with respect to one another.

A device is provided for determination of any quadrature bias of the Coriolis gyro as well as a control loop for regulating the strength of the electrostatic field as a function of the determined quadrature bias so that the determined quadrature bias is as small as possible.

In a third aspect, the invention provides a Coriolis gyro having a first and a second resonator. The resonators are each in the form of a coupled system including a first and a second linear oscillator.

The first resonator is mechanically or electrostatically connected/coupled to the second resonator so that the two resonators can be caused to oscillate in antiphase with respect to one another along a common oscillation axis.

The foregoing and other features of the invention will become further apparent from the detailed description that follows. Such description is accompanied by a set of drawing figures. Numerals of the drawings, corresponding to those of the written description, point to the features of the invention with like numerals referring to like features throughout.

DETAILED DESCRIPTION OF THE PREFERRED EMBODIMENT

Figure 1:
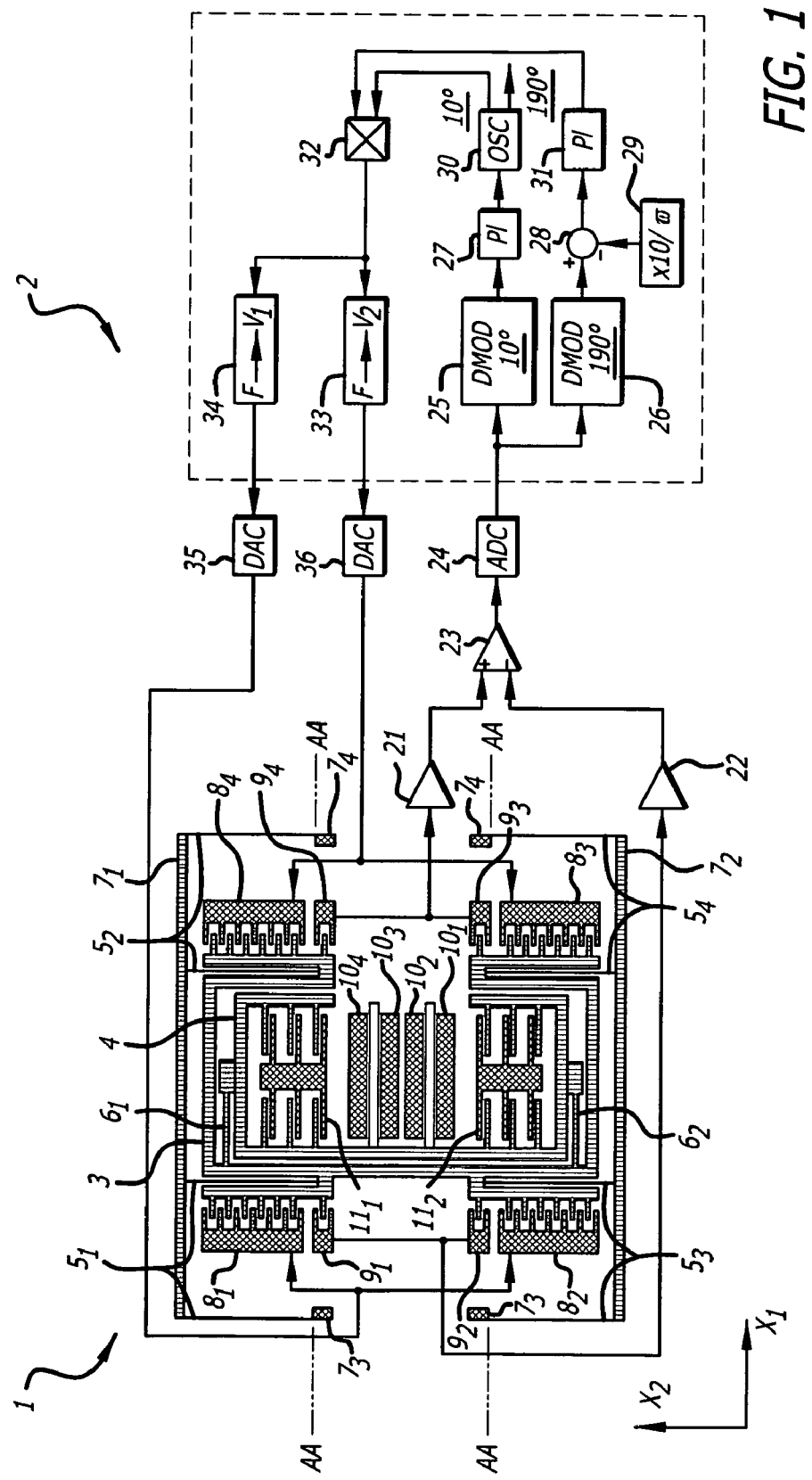
FIG. 1 is a schematic illustration of one possible embodiment of a mass system having two linear oscillators, with corresponding control loops, for exciting the first oscillator.

The method of the invention for quadrature-bias compensation can be applied, in particular, to Coriolis gyros whose resonators are in the form of coupled systems comprising at least one first and one second linear oscillator. The total quadrature bias of the oscillator system is preferably determined by demodulation of a read signal produced by read electrodes, with 0° and appropriate resetting. It is also possible to determine only a portion of the quadrature bias, produced by the alignment error of the two linear oscillators with respect to one another. (The expression "quadrature bias" covers both alternatives.)

Quadrature bias is thus eliminated at its point of origin i.e., mechanical alignment errors of the two oscillators with respect to one another are compensated by an electrostatic force that acts on one or both oscillators and is produced by the electrostatic field.

The Coriolis gyro has first and second spring elements, with the first oscillator connected by means of the first spring elements to a frame of the Coriolis gyro and the second oscillator connected by the second spring elements to the first oscillator. The electrostatic field results in a change in the alignment of the first and/or the second spring elements. The alignment of the second spring elements is preferably varied by varying the position/alignment of the second oscillator with the electrostatic field. Analogously, the alignment of the first spring elements is preferably varied by varying the position/alignment of the first oscillator by means of the electrostatic field. The change in the positions/alignments of the oscillators in such case results in bending the spring elements attached to the oscillators, making it possible to correct corresponding alignment angles of the first spring elements with respect to the second spring elements.

In a particularly preferred embodiment, the electrical field varies the alignment angles of the first and second spring elements so that they are made orthogonal with respect to one another. This compensates for the quadrature-bias (component) produced. If there are any further contributions to quadrature bias, the angle error with respect to orthogonality is adjusted so that the total quadrature bias disappears. The alignment angles of the second spring elements with respect to the first oscillator are preferably varied by the electrostatic field and the alignment angles of the first spring elements with respect to the gyro frame of the Coriolis gyro are unchanged. It is possible to use the electrostatic field to vary only the alignment angles of the first spring elements, or to vary the alignment angles of both the first and the second spring elements.

The invention also provides a Coriolis gyro whose resonator is in the form of a coupled system comprising at least one first and one second linear oscillator. It includes a device for production of an electrostatic field to vary the alignment of the two oscillators with respect to one another as well as a device for determining quadrature bias caused by alignment errors of the two oscillators with respect to one another and with other coupling mechanisms. A control loop regulates the strength of the electrostatic field as a function of the determined quadrature bias so that the quadrature bias is as small as possible.

The Coriolis gyro has first and second spring elements. The first spring elements connect the first oscillator to the frame of the Coriolis gyro, and the second spring elements connect the second oscillator to the first oscillator. The alignments of the first and second spring elements are preferably at right angles to one another and may be of any desired form.

It has been found to be advantageous for the second oscillator to be attached to or clamped in on the first oscillator "at one end". "Clamped in at one end" can be understood not only in the sense of the literal wording but also in a general sense. In general, attached or clamped in "at one end" means that the force is introduced from the first oscillator to the second oscillator essentially from one "side" of the first oscillator. If, for example, the oscillator system were designed so that the second oscillator were bordered by the first oscillator and connected to it by means of second spring elements, then the expression "clamped in or attached at one end" would imply that the second oscillator is readjusted for movement of the first oscillator, with the first oscillator alternately "pushing" or "pulling" the second oscillator by means of the second spring elements.

Clamping the second oscillator in at one end on the first oscillator has the advantage that, when an electrostatic force is exerted on the second oscillator as a result of the alignment/position change of the second oscillator, the second spring elements can be slightly curved, thus making it possible, without any problems, to vary the corresponding alignment angle of the second spring elements. If the second oscillator were to be attached to additional second spring elements so that during movement of the first oscillator, the second oscillator were at the same time to be "pulled" and "pushed" by the second spring elements, then this would be equivalent to the second oscillator being clamped in or attached "at two ends" to the first oscillator (with the force being introduced to the second oscillator from two opposite ends of the first oscillator). In such case, the additional second spring elements would produce corresponding opposing forces when an electrostatic field is applied, so that changes in the alignment angles of the second spring elements could be achieved only with difficulty. However, clamping in at two ends is acceptable when the additional second spring elements are designed so that the influence of these spring elements is small so that all of the spring elements can bend without any problems. That is, the clamping in is effectively at one end.

Depending on the design of the oscillator, clamping in at one end can be effectively provided just by the "influence" (force introduction) of the additional second spring elements being 40% or less. However, this value does not present any limitation on the invention. It is also feasible for the influence of the second spring elements to be more than 40%. For example, clamping in at one end can be achieved by all of the second spring elements that connect the second oscillator to the first oscillator being arranged parallel and on the same plane. All start and end points of the second spring elements are in each case attached to the same ends of the first and second oscillator. The start and end points of the second spring elements may each advantageously be on a common axis, with the axes intersecting the second spring elements at right angles.

If the second oscillator is attached to or clamped on the first oscillator at one end, then the first spring elements are preferably designed to clamp the first oscillator in on the gyro frame at two ends (the expressions "at one end" and "at two ends" can be used analogously) . As an alternative, however, it is possible for the spring elements also to be designed to clamp in the first oscillator at one end. For example, all the first spring elements that connect the first oscillator to the gyro frame of the Coriolis gyro can be arranged parallel and on the same plane as one another, with the start and end points of the first spring elements in each case preferably being located on a common axis AA. It is equally possible for the spring elements to be designed so that the first oscillator is clamped in on the gyro frame at one end, and the second oscillator is clamped in at two ends by the first oscillator. It is also possible for both oscillators to be clamped in at two ends. For quadrature bias compensation, it has been found to be advantageous for at least one of the two oscillators to be clamped in at one end.

A further embodiment of a Coriolis gyro has a first and a second resonator, each in the form of a coupled system comprising a first and a second linear oscillator. The first resonator is mechanically or electrostatically connected/coupled to the second resonator so that they can be caused to oscillate in antiphase with respect to one another along a common oscillation axis.

Such embodiment includes a mass system that comprises two double-oscillator systems (i.e., two resonators) or four linear oscillators. Antiphase oscillation of the two resonators with respect to one another results in the center of gravity of the mass system remaining unchanged (provided that the two resonators are appropriately designed). As a result, oscillation of the mass system cannot produce any external vibration that would, in turn, result in disturbances in the form of damping/reflections. Furthermore, external vibrations and accelerations in the direction of the common oscillation axis have no influence on antiphase movement of the two resonators along the common oscillation axis.

For example, the first resonator can be coupled to the second resonator via a spring system. A further option is for the first resonator to be coupled to the second resonator via an electrostatic field. Both couplings can be used alone or in combination. It is sufficient for the two resonators to be formed in a common substrate, so that the mechanical coupling is provided by a mechanical spring connection formed by the common substrate itself.

In this embodiment, the Coriolis gyro advantageously has a device for the production of electrostatic fields to vary the alignment of the linear oscillators with respect to one another, a device for determination of the quadrature bias of the Coriolis gyro, and control loops for regulating the strengths of the electrostatic fields so that the determined quadrature bias is as small as possible.

The configurations of the first and second resonators are preferably identical. In this case, they are advantageously arranged axially symmetrically with respect to one another and to an axis of symmetry at right angles to the common oscillator axis (i.e. the first resonator is mapped by the axis of symmetry onto the second resonator).

In order to assist understanding of the background of the method of the invention, the physical principles of a Coriolis gyro will be explained briefly below, with reference to a linear double-oscillator system.

The Coriolis force can be represented as:

$$\vec{F} = 2m\,\vec{v}_s \times \vec{\Omega}$$

$\vec{F}$ Coriolis force m Mass of the oscillator $\vec{v}_s$ Velocity of the oscillator $\Omega$ Rotation rate  [1]

If the mass that reacts to the Coriolis force is equal to the oscillating mass, and the oscillator is operated at the natural frequency $\omega$, then:

$$2m\,\vec{v}_s \times \vec{\Omega} = m\,\vec{a}_c \quad [2]$$

The oscillator velocity is given by:

$$\vec{v}_s = \vec{v}_{s0}\sin\omega t \quad [3]$$

where $\vec{v}_{s0}$ oscillator amplitude $\omega$ natural frequency of the oscillator The oscillator and Coriolis accelerations are thus given by:

$$\vec{a}_s = \vec{v}_{s0}\omega\cos\omega t$$

$$\vec{a}_c = 2\vec{v}_{s0}\sin\omega t \times \vec{\Omega} \quad [4]$$

The two acceleration vectors are thus spatially at right angles to one another and are offset through 90° with respect to one another in the time function (spatial and time orthogonality).

These two criteria can be employed to separate oscillator acceleration $\vec{a}_s$ from the Coriolis acceleration $\vec{a}_c$. The ratio of the abovementioned acceleration amplitudes $a_c$ and $a_s$ is:

$$\frac{a_c}{a_s} = \frac{2\Omega}{\omega} \quad [5]$$

If the rotation rate is $\Omega = 5°/h$ and the natural frequency of the oscillator is $f_s = 10$ KHz, then:

$$\frac{a_c}{a_s} = 7.7 \cdot 10^{-10} \quad [6]$$

For an accuracy of 5°/h, undesirable couplings of the first oscillator to the second oscillator must not exceed $7.7 \cdot 10^{-10}$, or must be constant. If a mass system composed of two linear oscillators coupled to one another via spring elements is employed then the accuracy of the spatial orthogonality between the oscillation mode and the measurement mode is limited due to the alignment error of the spring elements. Achievable accuracy (limited by manufacturing tolerances) is $10^{-3}$ to $10^{-4}$. Time orthogonality accuracy is limited by the phase accuracy of the electronics at, for example, 10 KHz, which can likewise be complied with only to at most $10^{-3}$ to $10^{-4}$. This means that the ratio of the accelerations as defined above cannot be satisfied.

Realistically, the resultant error in the measured acceleration ratio $a_c/a_s$ is:

$$\frac{a_c}{a_s} = 10^{-6} \text{ to } 10^{-8} \quad [7]$$

The spatial error results in a so-called quadrature bias $B_Q$, which, together with the time phase error $\Delta_\phi$, results in a bias B:

$B_Q = 6.5 \cdot 10^{6}°/h$ to $6.5 \cdot 10^{5}°/h$ $\Delta_\phi = 10^{-3}$ to $10^{-4}$ $B = B_Q \cdot \Delta_{100} = 6{,}500°/h$ to $65°/h$  [8]

The quadrature bias thus results in a major limitation to measurement accuracy. In this case, it should be noted that the preceding error analysis takes account only of the direct coupling of the oscillation mode to the read mode. Further quadrature bias components also exist and occur, for example, as a result of couplings with other oscillation modes.

FIG. 1 illustrates the schematic design of a linear double oscillator 1 with corresponding electrodes including a block diagram of associated evaluation/excitation electronics 2. The linear double oscillator 1 is preferably produced by etching a silicon wafer. It has a first linear oscillator 3, a second linear oscillator 4, first spring elements 5$_1$ to 5$_4$, second spring elements 6$_1$ and 6$_2$ as well as parts of an intermediate frame 7$_1$ and 7$_2$ and a gyro frame 7$_3$ and 7$_4$. The second oscillator 4 is mounted within the first oscillator 3 to oscillate, and is connected to it via the second spring elements 6$_1$, 6$_2$. The first oscillator 3 is connected to the gyro frame 7$_3$, 7$_4$ by the first spring elements 5$_1$ to 5$_4$ and the intermediate frame 7$_1$, 7$_2$.

First excitation electrodes 8$_1$ to 8$_4$, first read electrodes 9$_1$ to 9$_4$, second excitation electrodes 10$_1$ to 10$_4$, and second read electrodes $11_1$ and $11_2$ are also provided. All of the electrodes are mechanically connected to the gyro frame, although electrically isolated. (The expression "gyro frame" refers to a mechanical, non-oscillating structure in which the oscillators are "embedded", e.g., the non-oscillating part of the silicon wafer).

When the first oscillator 3 is excited by the first excitation electrodes $8_1$ to $8_4$ to oscillate in the X1 direction, such movement is transmitted through the second spring elements $6_1$, $6_2$ to the second oscillator 4 (alternate "pulling" and "pushing"). The vertical alignment of the first spring elements $5_1$ to $5_4$ prevents the first oscillator 3 from moving in the X2 direction. However, vertical oscillation can be carried out by the second oscillator 4 as a result of the horizontal alignment of the second spring elements $6_1$, $6_2$. When corresponding Coriolis forces occur, then the second oscillator 4 is excited to oscillate in the X2 direction.

A read signal that is read from the first read electrodes $9_1$ to $9_4$ and proportional to the amplitude/frequency of the X1 movement of the first oscillator 3 is supplied, via appropriate amplifier elements 21, 22 and 23, to an analog/digital converter 24. An appropriately digitized output signal from the analog/digital converter 24 is demodulated by a first demodulator 25 and by a second demodulator 26 to form corresponding output signals, with the two demodulators operating with an offset of 90° with respect to one another. The output signal from the first demodulator 25, whose output signal controls a frequency generator 30 so that the signal occurring downstream from the demodulator 25 is regulated at zero, is supplied to a first regulator 27 to regulate the frequency of the excitation oscillation (the oscillation of the mass system 1 in the X1 direction). Analogously, the output signal from the second demodulator 26 is regulated at a constant value (predetermined by the electronics component 29). A second regulator 31 insures that the amplitude of the excitation oscillation is regulated. The output signals from the frequency generator 30 and the amplitude regulator 31 are multiplied by one another at a multiplier 32. An output signal from the multiplier 32, which is proportional to the force to be applied to the first excitation electrodes $8_1$ to $8_4$, acts not only on a first force/voltage converter 33 but also on a second force/voltage converter 34, which use the digital force signal to produce digital voltage signals. The digital output signals from the force/voltage converters 33, 34 are converted by first and second digital/analog converters 35, 36 to corresponding analog voltage signals. Such signals are then passed to the first excitation electrodes $8_1$ to $8_4$. The first and second regulators 27, 31 readjust the natural frequency of the first oscillator 3 and set the amplitude of the excitation oscillation to a specific, predeterminable value.

Figure 2:
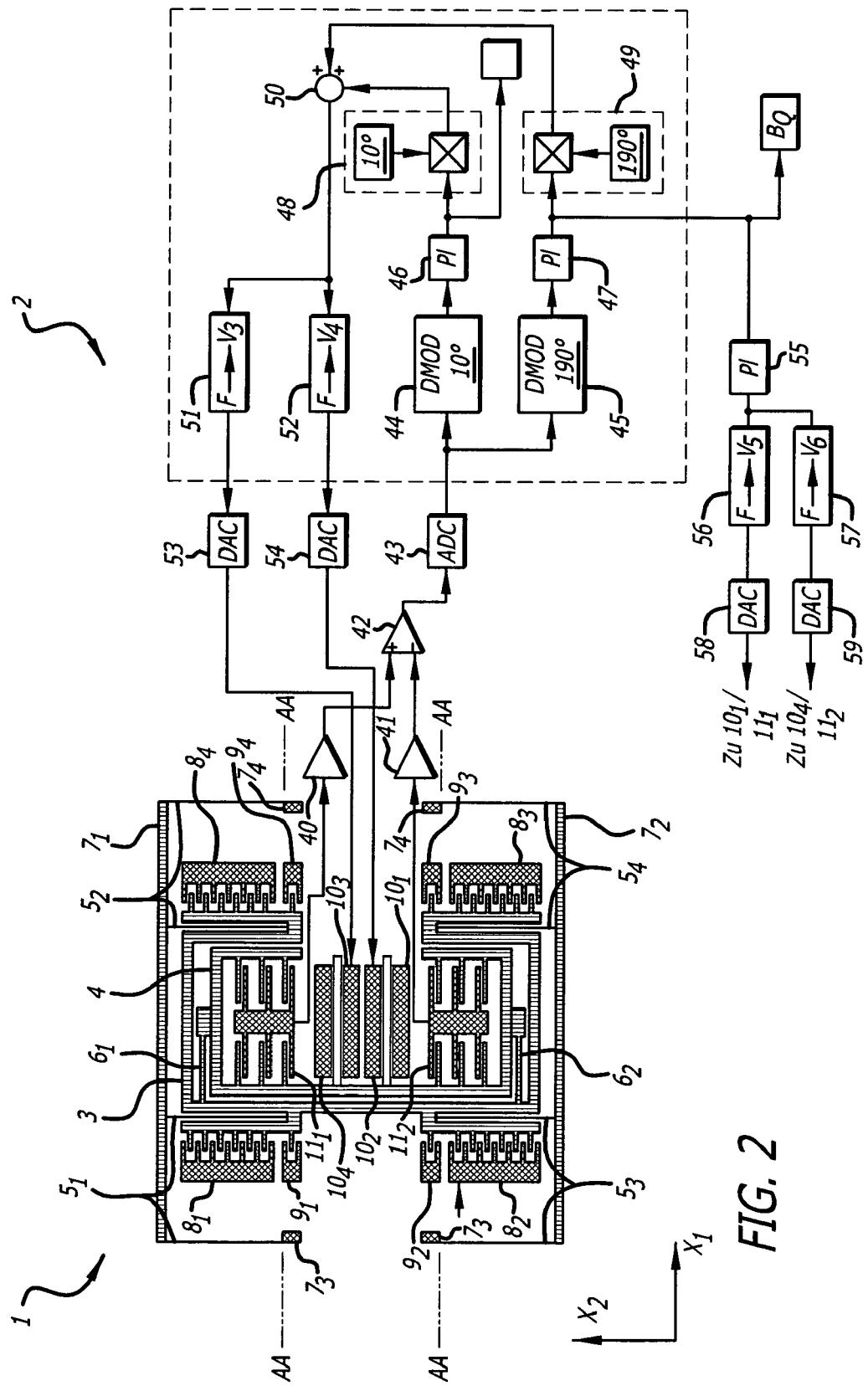
FIG. 2 is a schematic illustration of a possible embodiment of a mass system having two linear oscillators with corresponding measurement and control loops for a rotation rate $\Omega$ and a quadrature bias $B_Q$, as well as auxiliary control loops for compensation of the quadrature bias $B_Q$.

When Coriolis forces occur, resultant movement of the second oscillator 4 in the X2 direction (read oscillation) is detected by the second read electrodes $11_1$, $11_2$, and a read signal, proportional to the movement of the read oscillation, is supplied via appropriate amplifier elements 40, 41 and 42 to an analog/digital converter 43 (see FIG. 2). A digital output signal from the analog/digital converter 43 is demodulated by a third demodulator 44 in phase with the direct-bias signal and demodulated by a fourth demodulator 45, offset through 90°. A corresponding output signal from the first demodulator 44 is applied to a third regulator 46, whose output signal is a compensation signal that corresponds to the rotation rate Ω to be measured. An output signal from the fourth demodulator 45 is applied to a fourth regulator 47 whose output signal is a compensation signal proportional to the quadrature bias to be compensated. The output signal from the third regulator is modulated by a first modulator 48, and the output signal from the fourth regulator 47 is modulated in an analogous manner by a second modulator 49, so that amplitude-regulated signals are produced whose frequencies correspond to the natural frequency of the oscillation in the X1 direction (sin≅0°, cos≅90°). Corresponding output signals from the modulators 48, 49 are added in an addition stage 50, whose output signal is supplied both to a third force/voltage converter 51 and to a fourth force/voltage converter 52. The corresponding output signals for the force/voltage converters 51, 52 are supplied to digital/analog converters 53, 54, whose analog output signals are applied to the second excitation electrodes $10_2$ to $10_3$, and reset the oscillation amplitudes of the second oscillator 4.

The electrostatic field produced by the second excitation electrodes $10_1$ and $10_4$ (or the two electrostatic fields produced by the electrode pairs $10_1$, $10_3$ and $10_2$, $10_4$) results in an alignment/position change of the second oscillator 4 in the X2 direction, and thus in a change in the alignments of the second spring elements $6_1$ to $6_2$. The fourth regulator 47 regulates the signal applied to the second excitation electrodes $10_1$ and $10_4$ so that the quadrature bias included in the compensation signal of the fourth regulator 47 is as small as possible, or disappears. A fifth regulator 55, a fifth and a sixth force/voltage converter 56, 57 and two analog/digital converters 58, 59 are used for this purpose.

The output signal from the fourth regulator 47, which is a measure of the quadrature bias, is supplied to the fifth regulator 55 that regulates the electrostatic field produced by the two excitation electrodes $10_1$ and 104 so that the quadrature bias $B_Q$ disappears. An output signal from the fifth regulator 55 is supplied to the fifth and sixth force/voltage converters 56, 57 for this, employing the digital force/output signal from the fifth regulator 55 to produce digital voltage signals that are then converted to analog voltage signals in the digital/analog converters 58, 59. The analog output signal from the digital/analog converter 58 is supplied to the second excitation electrode $10_1$ (alternatively to electrode $11_1$). The analog output signal from the digital/analog converter 59 is supplied to the second excitation electrode $10_4$ (alternatively to electrode $11_2$).

As the second oscillator 4 is clamped only by the second spring elements $6_1$ to $6_2$ (clamped at one end), such alignment of the spring elements can be varied without problem by the electrostatic field. It is additionally possible to provide additional second spring elements, resulting in the second oscillator 4 being clamped at two ends, provided that such additional elements are appropriately designed to insure that clamping at one end is effective. In order to permit the same effect for the spring elements $5_1$, $5_2$ (and for the spring elements $5_3$, $5_4$ as well) the third and fourth spring elements $5_3$, $5_4$, as well as the first and second spring elements $5_1$, $5_2$ may be omitted, resulting in the first oscillator 3 being clamped at one end (together with an appropriately modified electrode configuration, not shown). In such a situation, the second oscillator 4 may also be attached to the first oscillator by further spring elements to achieve clamping at two ends.

The electrode arrangements shown in FIGS. 1 and 2 may be varied. For example, the electrodes identified by the reference numbers $8_1$, $9_1$, $9_2$, $8_2$ as well as $8_3$, $9_3$, $9_4$, $8_4$ in FIGS. 1 and 2 may alternatively be combined to form one electrode. An electrode combined in this way may be allocated a plurality of tasks by using suitable carrier frequency methods (i.e., the electrode has read, excitation and compensation functions). The electrodes identified by the reference numbers $11_1$, $10_1$, $10_3$ as well as $11_2$, $10_2$ and $10_4$ can also be combined to form one electrode.

A preferred embodiment of the Coriolis gyro of the invention as well as its method of operation will be described in more detail with reference to FIG. 3, a schematic illustration of a mass system comprising four linear oscillators with corresponding measurement and control loops for rotation rate and quadrature bias, as well as auxiliary control loops for compensation of the quadrature bias. The schematic layout of coupled system 1' comprises a first resonator $70_1$ and a second resonator $70_2$. The first resonator $70_1$ is coupled to the second resonator $70_2$ by a mechanical coupling element (a spring) 71. The first and the second resonator $70_1$, $70_2$ are formed in a common substrate and may be caused to oscillate in antiphase with respect to one another along a common oscillation axis 72. The first and the second resonators $70_1$, $70_2$ are identical, and are mapped onto one another via an axis of symmetry 73. The design of the first and second resonators $70_1$, $70_2$ has been explained in conjunction with FIGS. 1 and 2 and will therefore not be explained again. (Identical and mutually corresponding components or component groups are identified by the same reference numbers with identical components associated with different resonators being identified by different indices.)

Figure 3:
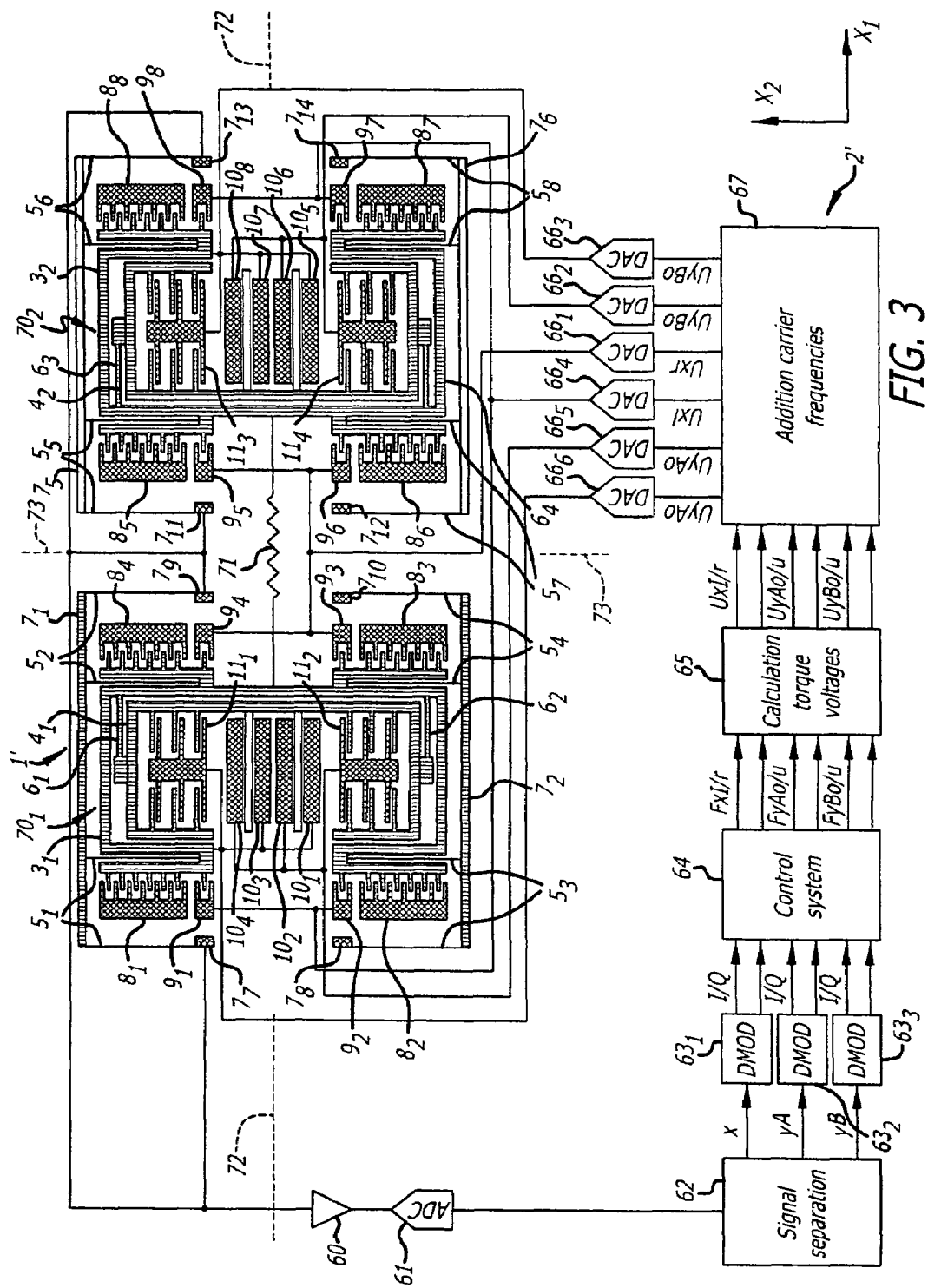
FIG. 3 is a schematic illustration of a mass system in accordance with an embodiment of the invention, which comprises four linear oscillators, with corresponding measurement and control loops for a rotation rate $\Omega$ and a quadrature bias $B_Q$, as well as auxiliary control loops for compensation of the quadrature bias.

A major difference between the double oscillators shown in FIG. 3 and those shown in FIGS. 1 and 2 is that some of the individual electrodes are physically combined to form one overall electrode. For example, the individual electrodes identified by the reference numbers $8_1$, $8_2$, $9_1$ and $9_2$ in FIG. 3 form a common electrode. Further, the individual electrodes identified by the reference numbers $8_3$, $8_4$, $9_3$ and $9_4$ form a common electrode, those with the reference numbers $10_4$, $10_2$, $11_2$ as well as the reference numbers $11_1$, $10_3$ and $10_1$ each form an overall electrode. The same applies in an analogous manner to the other double-oscillator system.

During operation of the coupled system 1' in accordance with the invention, the two resonators $70_1$, $70_2$ oscillate in antiphase along the common oscillation axis 72. The coupled system 1' is thus not susceptible to external disturbances or to those emitted by the coupled system 1' itself into the substrate in which the resonators $70_1$ and $70_2$ are mounted.

When the coupled system 1' is rotated, the second oscillators $4_1$ and $4_2$ are deflected in mutually opposite directions (i.e., the X2 direction and opposite to the X2 direction). When an acceleration of the coupled system 1' occurs, the second oscillators $4_1$, $4_2$ are each deflected in the same direction, i.e., in the same direction as the acceleration provided that such acceleration is in the X2 direction, or in the opposite direction. Accelerations and rotations can thus be measured simultaneously or selectively. Quadrature bias compensation can be carried out during the measurement process in the resonators $70_1$, $70_2$. However, this is not absolutely essential.

In principle, it is possible to operate the coupled system 1' on the basis of the evaluation/excitation electronics 2 described with reference to FIGS. 1 and 2. An alternative method (carrier frequency method) is instead used in the embodiment of FIG. 3. Such operating method will be described below.

The evaluation/excitation electronics 2 identified by the reference number 2' include three control loops: a first control loop for excitation and/or control of an antiphase oscillation of the first oscillators $3_1$ and $3_2$ along the common oscillation axis 72, a second control loop for resetting and compensation of the oscillations of the second oscillator $4_1$ along the X2 direction, and a control loop for resetting and compensation of the oscillations of the second oscillator $4_2$ along the X2 direction. The three described control loops include an amplifier 60, an analog/digital converter 61, a signal separation module 62, a first to third demodulation module $63_1$ to $63_3$, a control module 64, an electrode voltage calculation module 65, a carrier frequency addition module 67, and a first to sixth digital/analog converter $66_1$ to $66_6$.

Carrier frequencies can be applied to the electrodes $8_1$ to $8_8$, $9_1$ to $9_8$, $10_1$ to $10_8$ and $11_1$ to $11_4$ for tapping excitation of the antiphase oscillation or of the oscillations of the second oscillators $4_1$, $4_2$. This may be accomplished in a number of ways. They include a) using three different frequencies, with one frequency associated with each control loop, b) using square-wave signals with a time-division multiplexing method, and c) using random phase scrambling (stochastic modulation method).

The carrier frequencies are applied to the electrodes $8_1$ to $8_8$, $9_1$ to $9_8$, $10_1$ to $10_8$ and $11_1$ to $11_4$ via the associated signals UyAo, UyAu (for the second oscillator $4_1$) Uxl, Uxr (for the antiphase resonance of the first oscillators $3_1$ to $3_2$) and UyBu and UyBo (for the second oscillator $4_2$), that are produced in the carrier frequency addition module 67 and excited in antiphase with respect to the abovementioned frequency signals. The oscillations of the first and second oscillators $3_1$, $3_2$, $4_1$ and $4_2$ are tapped off via those parts of the gyro frame identified by the reference numbers $7_7$, $7_9$, $7_{11}$ and $7_{13}$, (used as tapping electrodes in addition to their function as suspension points for the mass system). For this, the two resonators $70_1$, $70_2$ are preferably designed to be electrically conductive, with all of the frames, springs and connections. The signal, tapped off by means of the gyro frame parts $7_7$, $7_9$, $7_{11}$ and $7_{13}$ and supplied to the amplifier 60, contains information about all three oscillation modes. It is converted by the analog/digital converter 61 to a digital signal supplied to the signal separation module 62.

The assembled signal is separated into three different signals in the signal separation module 62: x (which contains information about the antiphase oscillation), yA (which contains information about the deflection of the second oscillator $4_1$) and yB (which contains information about the deflection of the second oscillator $4_2$). The signals are separated differently in accordance with the type of carrier frequency method used (see a) to c) above). Separation is carried out by demodulation with the corresponding signals of the carrier frequency method. The signals x, yA and yB are supplied to the demodulation modules $63_1$ to $63_3$ that demodulate them with an operating frequency of the antiphase oscillation for 0° and 90°. The control module 64 and the electrode voltage calculation module 65 for regulation/calculation of the signals Fxl/r or Uxl/r, respectively, are preferably configured analogously to the electronics module 2 of in FIG. 1. The control module 64 and the electrode voltage calculation module 65 (for regulation/calculation of the signals FyAo/u, UyAo/u, and FyBo/u, UyBo/u) are preferably designed analogously to the electronics module 2 of FIG. 2. The only difference is that the signals for resetting the rotation rate and the quadrature after the multiplication by the operating frequency are passed together with DC voltages for the quadrature auxiliary regulator to a combined electrode pair. The two signals are therefore added, so that calculation of the electrode voltages includes the resetting signals for oscillation frequency and the DC signal for quadrature regulation as well as frequency tuning. The electrode voltages Uxl/r, UyAo/u and UyBo/u calculated in this way are then added to the carrier-frequency signals and passed jointly via the analog/digital converters $66_1$ to $66_6$ to the electrodes.

Figure 4A:
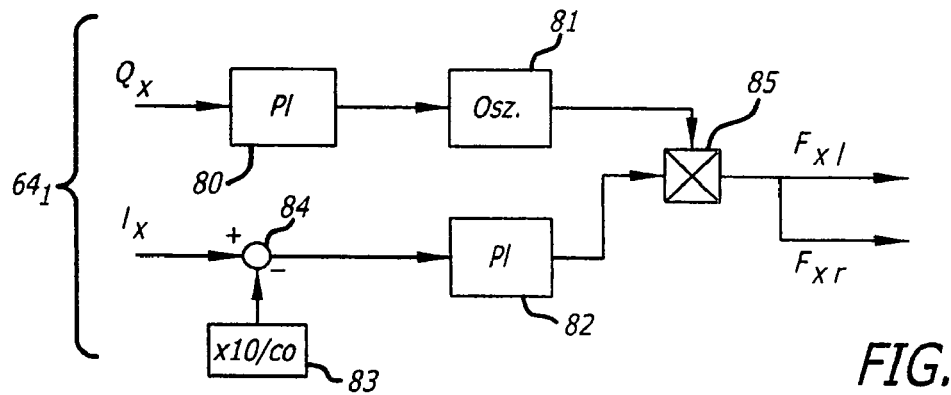
FIG. 4 is a block diagram of an embodiment of a control system for incorporation into a mass system in accordance with that illustrated in FIG. 3 above.
Figure 4B:
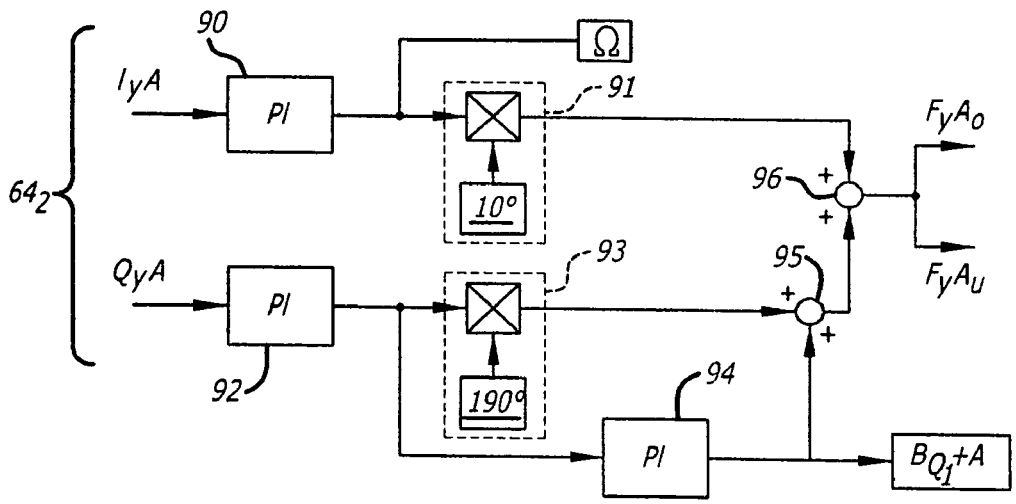
Figure 4C:
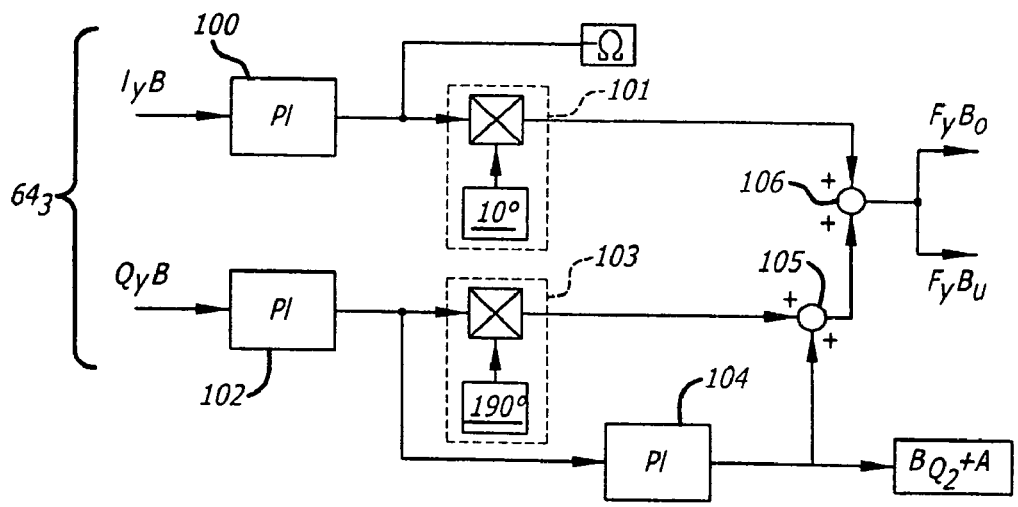

FIG. 4 is a block diagram of an embodiment of a control system for incorporation into a mass system in accordance with FIG. 3. It shows one preferred embodiment of the control system identified by the reference number 64 in FIG. 3. The control system 64 includes a first to third part $64_1$ to $64_3$. the first part $64_1$ has a first regulator 80, a frequency generator 81, a second regulator 82, an electronics component 83, an addition stage 84 and a multiplier 85. The operation of the first part corresponds essentially to that of the electronics module 2 of FIG. 1 and will therefore not be described once again. The second part $64_2$ has a first regulator 90, a first modulator 91, a second regulator 92, a second modulator 93 and a third regulator 94. A first and a second addition stage 95, 96 are also provided. A rotation rate signal Ω can be determined at the output of the first regulator 90, and an assembled signal comprising the compensation of the quadrature bias $B_{Q1}$ and an acceleration A can be determined at the output of the third regulator 94.

The third part $64_3$ of the control system 64 has a first regulator 100, a first modulator 101, a second regulator 102, a second modulator 103 and a third regulator 104. A first and a second addition stage 105, 106 are also provided. A rotation rate signal Ω with negative mathematical sign can be tapped off at the output of the first regulator 100 and an assembled signal comprising the compensation of the quadrature bias $B_{Q2}$ with negative mathematical sign and an acceleration signal A can be tapped off at the output of the third regulator 104. The method of operation of the second and of the third parts $64_2$ and $64_3$ corresponds to that of the electronics module 2 illustrated in FIG. 2, and will therefore not be explained again.

Only the signals for resetting rotation rate and quadrature, after multiplication by the operating frequency, are passed, together with the DC voltages for the quadrature auxiliary regulator, to a combined electrode pair. The two signals are therefore added so that the calculation of the electrode voltages includes the reset signals for oscillation frequency and the DC signal for quadrature regulation. The electrode voltages Uxl/r, UyAo/u and UyBo/u thusly calculated are then added to the carrier frequency signals and jointly passed via the analog/digital converters $66_1$ to $66_6$ to the electrodes.

The carrier frequency methods described above with antiphase excitation have the advantage that a signal is applied to the amplifier 60 only when the linear oscillators $3_1$, $3_2$, as well as $4_1$ and $4_2$, are deflected. The frequency signals used for excitation may be discrete frequencies or square-wave signals. Square-wave excitation is preferred, as it is easier to produce and process.

Linear double oscillators are distinguished by particularly high quality due to linear movement on the wafer plane. Compensation for the quadrature bias linear resonators in which at least one oscillator is clamped in at one end can be achieved, according to the invention, globally by adjustment of the orthogonality of the springs. This is achieved by varying the angle of the springs of the oscillator, clamped in at one end, by means of a DC voltage, such that the measured quadrature bias $B_Q$ becomes zero. As described above, a corresponding control loop is used for this purpose to regulate the abovementioned DC voltage so that $B_Q=0$. The control loop compensates for quadrature bias at the point of origin and improves the accuracy of linear oscillation gyros by a number of orders of magnitude. The linear oscillators of a resonator are preferably each operated at double resonance.

While the invention has been described with reference to a presently-preferred embodiment, it is not limited thereto. Rather, this invention is limited only insofar as it is defined by the following set of patent claims and includes within its scope all equivalents thereof.

What is claimed is:

1. A method for quadrature-bias compensation in a Coriolis gyro, whose resonator is in the form of a coupled system comprising a first and a second linear oscillator, in which the first oscillator is attached to a gyro frame of the Coriolis gyro by means of first spring elements and the second oscillator is attached to the first oscillator by means of second spring elements, having the following steps:

determination of the quadrature bias of the Coriolis gyro,
production of an electrostatic field, in order to vary the mutual alignment of the two oscillators with respect to one another, with the electrostatic field producing a constant electrostatic force which causes a change in the alignment of the first spring elements and/or a change in the alignment of the second spring elements, and with the alignment/strength of the electrostatic field being regulated such that the determined quadrature bias is as small as possible.

2. The method as claimed in claim 1, characterized in that the alignment of the first spring elements is varied by varying the position/alignment of the first oscillator by means of the electrostatic field, and in that the alignment of the second spring elements is varied by varying the position/alignment of the second oscillator by means of the electrostatic field.

3. The method as claimed in claim 1, characterized in that the electrical field results in the alignments of the first and second spring elements being made orthogonal with respect to one another.

4. A Coriolis gyro, having a first resonator which is in the form of a coupled system comprising a first and a second linear oscillator, with the first oscillator being attached to a gyro frame of the Coriolis gyro by means of first spring elements, and the second oscillator being attached to the first oscillator by means of second spring elements, having,
a device for production of an electrostatic field by means of which the alignment of the two oscillators with respect to one another can be varied, in which the electrostatic field produces a constant electrostatic force which varies the alignment angle of the first spring elements with respect to the gyro frame and/or the alignment angle of the second spring elements with respect to the first oscillator,
a device for determination of any quadrature bias of the Coriolis gyro, and
a control loop, by means of which the strength of the electrostatic field is regulated as a function of the determined quadrature bias such that the determined quadrature bias is as small as possible.

5. The Coriolis gyro as claimed in claim 4, characterized in that all of the second spring elements which connect the second oscillator to the first oscillator are designed such that force is introduced from the first oscillator to the second oscillator essentially from one side of the first oscillator.

6. The Coriolis gyro as claimed in claim 4, characterized in that all of the first spring elements which connect the first oscillator to the gyro frame of the Coriolis gyro are arranged parallel and on the same plane as one another, with the start and end points of the first spring elements each being located on a common axis.

7. A Coriolis gyro as claimed in claim 4, characterized by a second resonator, which is in the form of a coupled system comprising a first and a second linear oscillator, with the first resonator being mechanically/electrostatically connected/coupled to the second resonator such that the two resonators can be caused to oscillate in antiphase with respect to one another along a common oscillation axis.

8. The Coriolis gyro as claimed in claim 7, characterized in that the configurations of the first and of the second resonator are identical, with the resonators being arranged axially symmetrically with respect to one another, with respect to an axis of symmetry which is at right angles to the common oscillation axis.

* * * * *